United States Patent
Higley et al.

(10) Patent No.: US 12,072,536 B2
(45) Date of Patent: Aug. 27, 2024

(54) RESTRAINING MECHANISMS AND METHOD FOR RESTRICTING COMPONENT MOVEMENT DURING CURING FOR A FIBER OPTIC CONNECTOR

(71) Applicant: US Conec, Ltd, Hickory, NC (US)

(72) Inventors: Jason Higley, Hickory, NC (US); Michael E. Hughes, Hickory, NC (US); Darrell R. Childers, Hickory, NC (US); Shubhrangshu Sengupta, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 280 days.

(21) Appl. No.: 17/635,008

(22) PCT Filed: Aug. 21, 2020

(86) PCT No.: PCT/US2020/047526
§ 371 (c)(1),
(2) Date: Feb. 14, 2022

(87) PCT Pub. No.: WO2021/041262
PCT Pub. Date: Mar. 4, 2021

(65) Prior Publication Data
US 2022/0291457 A1 Sep. 15, 2022

Related U.S. Application Data

(60) Provisional application No. 62/891,031, filed on Aug. 23, 2019.

(51) Int. Cl.
*G02B 6/38* (2006.01)
(52) U.S. Cl.
CPC ......... *G02B 6/3821* (2013.01); *G02B 6/3861* (2013.01); *G02B 6/3878* (2013.01)

(58) Field of Classification Search
CPC ............................ G02B 6/3878; G02B 6/3861
See application file for complete search history.

(56) References Cited

U.S. PATENT DOCUMENTS

| | | | |
|---|---|---|---|
| 10,371,903 B1 | 8/2019 | Nguyen et al. | |
| 11,016,250 B2 * | 5/2021 | Higley | G02B 6/3898 |
| 2010/0086266 A1 | 4/2010 | Marcouiller et al. | |
| 2015/0331202 A1 | 11/2015 | Rosson | |

FOREIGN PATENT DOCUMENTS

| | | |
|---|---|---|
| JP | 3342849 B2 | 11/2002 |
| WO | 2019126333 A1 | 6/2019 |

OTHER PUBLICATIONS

International Search Report PCT/US2020/047526, Dec. 4, 2020.
Written Opinion of the International Search Authority, PCT/US2020/047526, Dec. 4, 2020.

* cited by examiner

*Primary Examiner* — Sung H Pak
(74) *Attorney, Agent, or Firm* — Michael L. Leetzow PLLC; Shubhrangshu Sengupta

(57) ABSTRACT

A retaining mechanism engages springs in a fiber optic connector to prevent movement of the springs relative to the fiber optic ferrules and the housing during curing of an epoxy inserted into the fiber optic connector. The retaining mechanism may be removably attached to the housing of the fiber optic connector. It may be inserted from a rear end of the fiber optic connector or disposed around an outside portion of the housing. The retaining mechanism may also be integral with an inside surface of the housing.

18 Claims, 13 Drawing Sheets

RESTRAINING MECHANISMS AND METHOD FOR RESTRICTING COMPONENT MOVEMENT DURING CURING FOR A FIBER OPTIC CONNECTOR

REFERENCE TO RELATED CASE

This application claims priority under 35 U.S.C. § 119 (e) to provisional application No. 62/891,031 filed on Aug. 23, 2019, the contents of which are hereby incorporated by reference in their entirety.

BACKGROUND OF THE INVENTION

Fiber optic connectors usually have a fiber optic ferrule and a spring disposed within a housing. Optical fibers need to be secured within an opening in the fiber optic ferrule, which is usually done with epoxy. In some fiber optic connectors, the fiber optic ferrule needs to be retained in a predetermined position relative to the other components of the fiber optic connector during the curing of the epoxy. This is particularly true for some connectors, including duplex connectors, where the crimp body and the spring push are integrated into a single component. This configuration makes it impossible to use the spring push to maintain those predetermined relative positions. Without some type of retaining mechanism, it is possible for the fiber optic ferrules and/or the springs to move or even fall out during the curing of the epoxy. If that happens, then the fiber optic connector may not be usable.

Curing the optical fibers in the fiber optic ferrules before inserting them in the housing is also not a viable option. The optical fibers may be longer or shorter than needed. This may cause a misalignment of the fiber optic ferrules in the fiber optic connector either due to too much optical fiber in the housing or too little. The fiber optic ferrules may also be askew within the housing. If the crimp body/spring push is installed before the epoxy is cured, then the epoxy may leak and bond some of the internal components together that are not to be bonded.

Thus, there is a need for a way to restrict the movement of the fiber optic ferrules and springs within the fiber optic connector while curing the epoxy. It has been determined that a retaining mechanism may be inserted into the housing to retain the springs in a predetermined location during the curing process. The retaining mechanism may be removable after the curing process is completed. Additionally, the housing may contain the retaining mechanism and engage the springs directly.

SUMMARY OF THE INVENTION

The present invention is directed to a housing for a fiber optic connector having two fiber optic ferrules and two springs, the housing includes a main body with a central opening for receiving from a rear end the two fiber optic ferrules and two springs, one of the springs being disposed behind each of the two ferrules, and a restraining mechanism engageable with the two springs, wherein the restraining mechanism is configured to prevent a movement of the two springs relative to the fiber optic ferrules and the housing during curing of an epoxy inserted into the fiber optic connector.

In some embodiments, the restraining mechanism is one of an insertable curing clip having at least one spring stop to engage the two springs and internal projections integral to the main body and projecting into the central opening, the internal projections each sized to engage one of the two springs.

In some embodiments, insertable curing clip is inserted from the rear end of the main body.

In other embodiments, the restraining mechanism comprises a main body having a first arm and a second arm, defining a space therebetween; and a spring stop on each of the first arm and the second arm on respective inside surfaces thereof and extending into the space, the inside surfaces of the first arm and second arm facing each other.

In another aspect of the current invention, there is a removable curing clip for a fiber optic connector having a housing, at least one fiber optic ferrule and at least one spring, the removable curing clip includes a main body having a first arm and a second arm, defining a space therebetween and a spring stop on each of the first arm and the second arm on respective inside surfaces thereof and extending into the space, the inside surfaces of the first arm and second arm facing each other.

In some embodiments, the main body further comprises a central portion, the central portion joining the first arm to the second arm.

In other embodiments, the spring stops pass through an opening in the housing of the fiber optic connector.

In yet other embodiments, the spring stops have a first surface and a second surface, the first surface to engage the at least one spring, the second surface to engage a spring push to push the spring stops out of an opening in the housing of the fiber optic connector.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
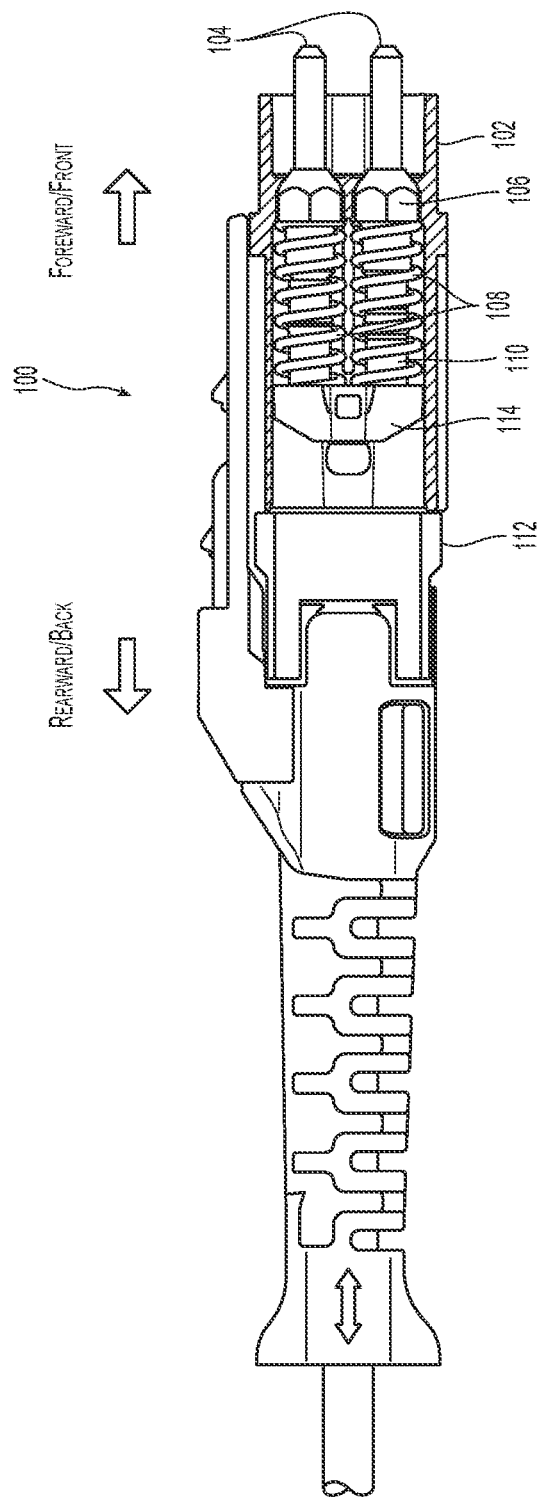
FIG. 1 is a cross section view of a duplex fiber optic connector illustrating the spring push and crimp body as a single element.
Figure 2:
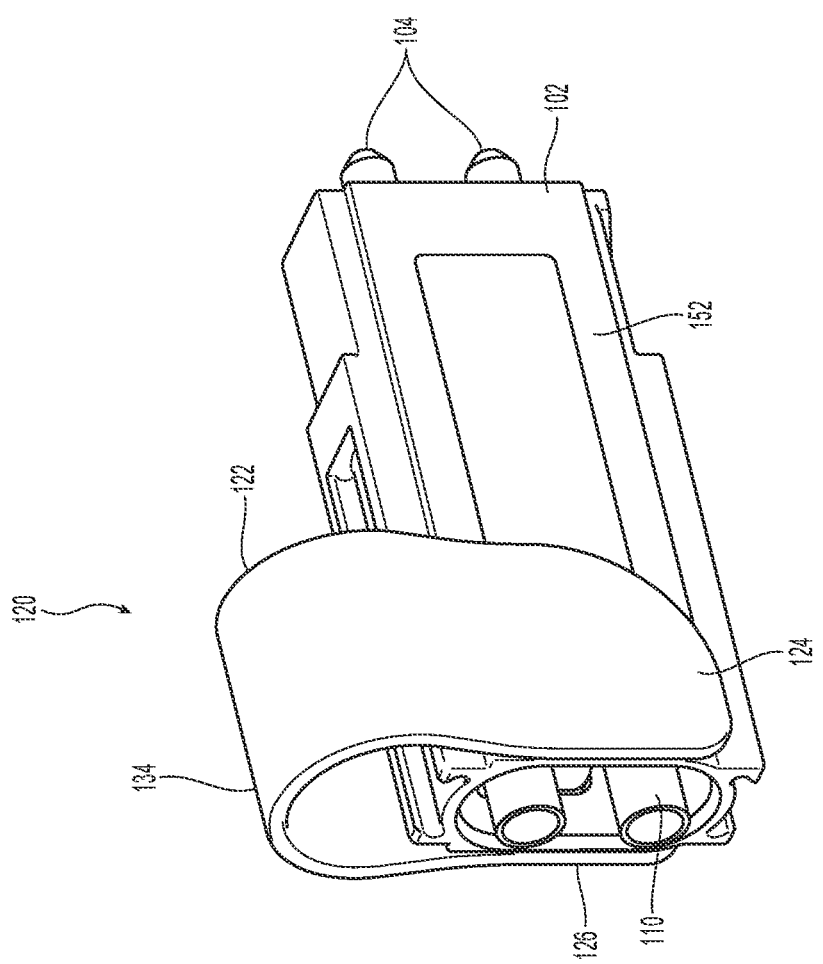
FIG. 2 is a perspective view of one embodiment of a restraining mechanism in the form of a removable curing clip according to the present invention removably attached to the housing, the housing having two fiber optic ferrules, springs and lead-in tubes.

Reference will now be made in detail to the present preferred embodiment(s) of the invention, examples of which are illustrated in the accompanying drawings. Whenever possible, the same reference numerals will be used throughout the drawings to refer to the same or like parts.

FIG. 1 illustrates an assembled fiber optic connector 100 with a housing 102, fiber optic ferrules 104, fiber optic ferrule holders 106, springs 108 behind the fiber optic ferrule holders 106 and around lead-in tubes 110. The crimp body 112, to which the Kevlar strength members (and cable jacket if present) are attached, is connected to the spring push 114. If the crimp body 112 and the spring push 114 were connected to the housing 102 during the application of the epoxy and the subsequent curing, the epoxy may leak on to any of the components of the fiber optic connector 100. Thus, a structure other than the spring push must be used to engage the springs 108 to keep the fiber optic ferrules 104, fiber optic ferrule holders 106, and springs 108 within the housing 102.

Applicant notes that the term "front" or "forward" means that direction where the fiber optic connector would meet with another fiber optic connector or device, while the term "rear" or "rearward" is used to mean the direction from which the optical fibers enter into the fiber-optic ferrule or fiber optic connector. Thus, "front" is that part of the fiber optic connector on the right side of FIG. 1 and "forward" is to the right. "Rearward" or "back" is that part of the fiber optic connector that is on the left side of the page and "rearward" and "backward" is toward the left.

Figure 8:
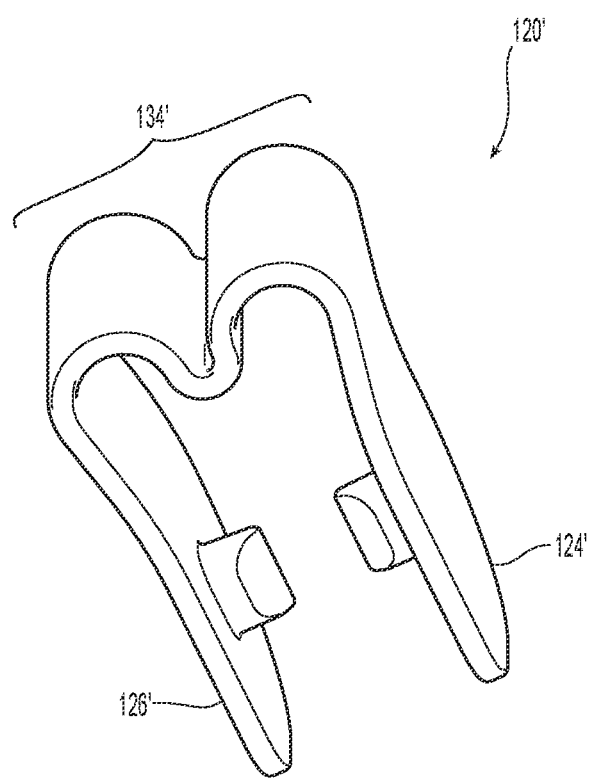
FIG. 8 is a another embodiment of a removable curing clip according to the present invention.
Figure 9:
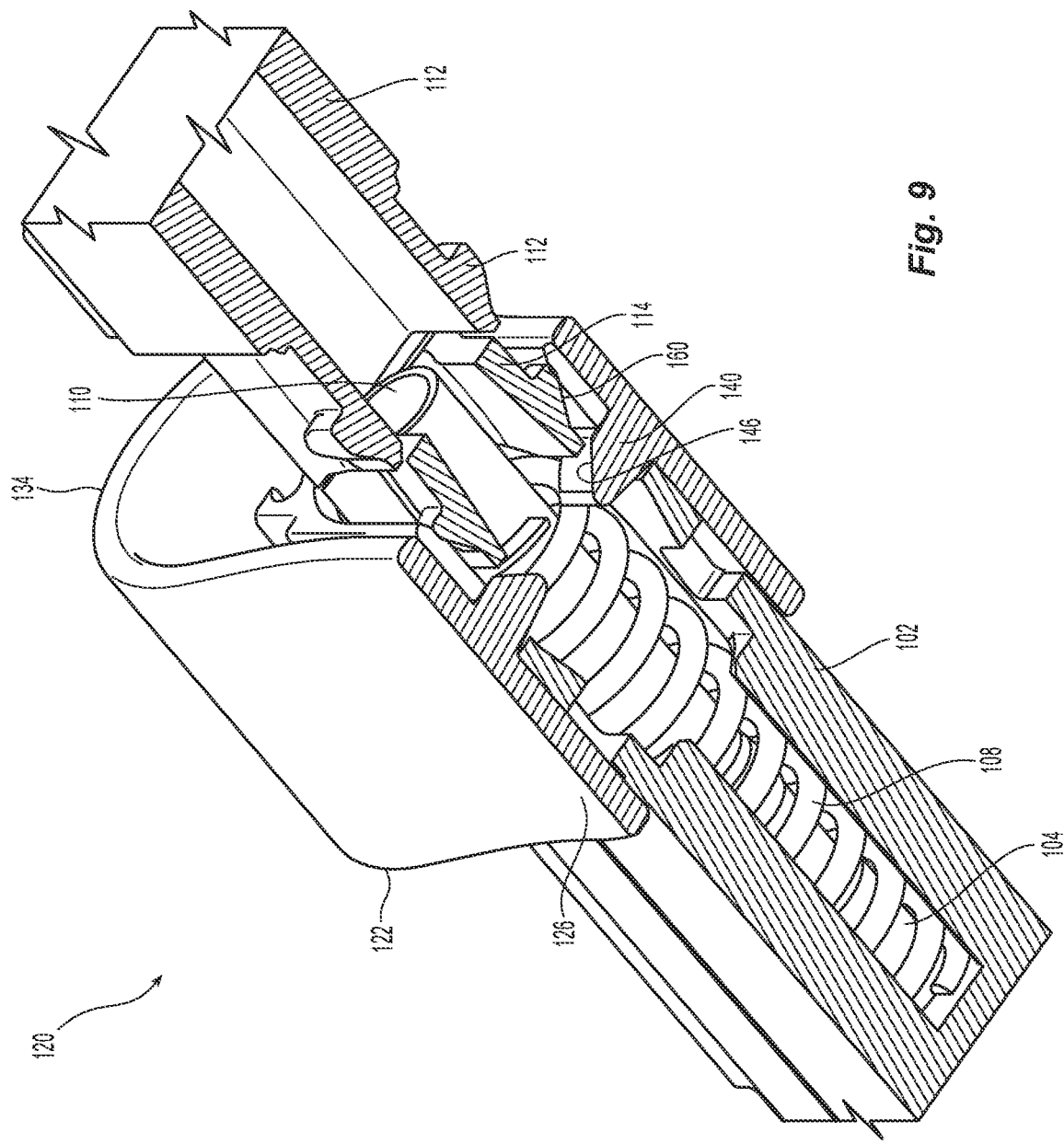
FIG. 9 is a cross section view from the bottom of the housing with a spring push disengaging the removable curing clip from the housing.
Figure 10:
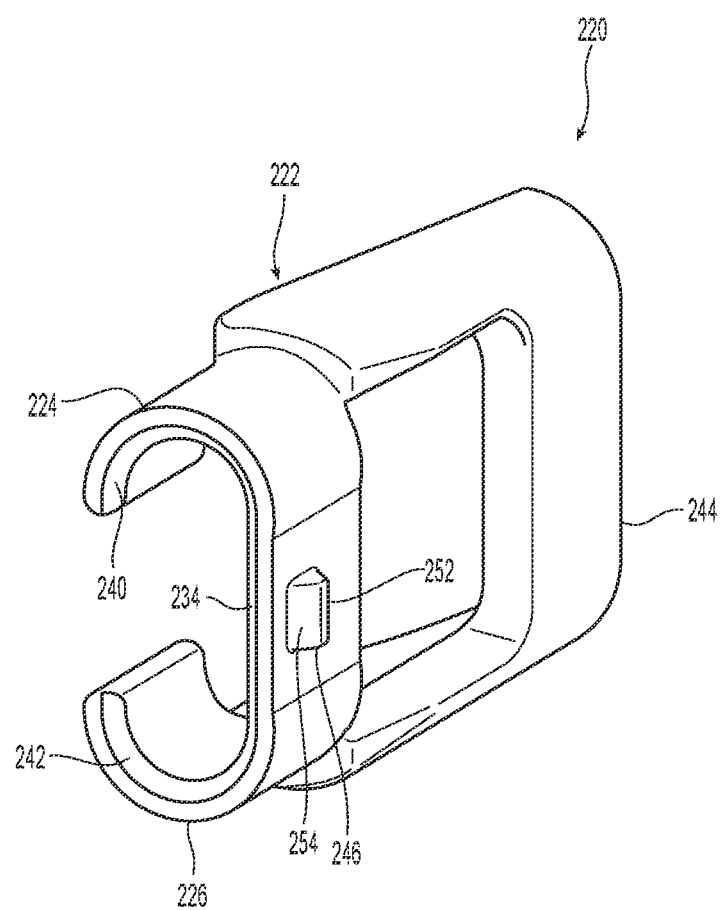
FIG. 10 is an end perspective view of another embodiment of a restraining mechanism according to the present invention.
Figure 11:
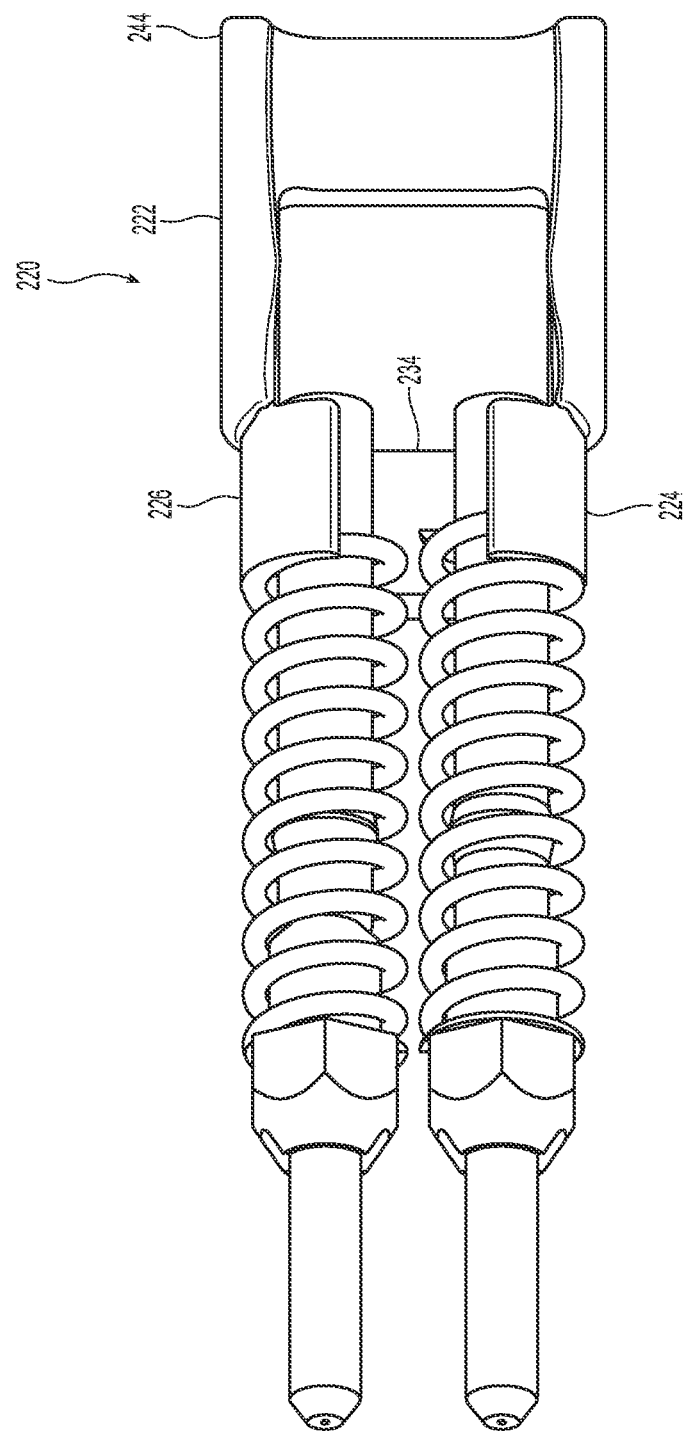
FIG. 11 is a perspective view of the restraining mechanism of FIG. 10 engaging the springs behind the ferrules with the housing removed for clarity.
Figure 12:
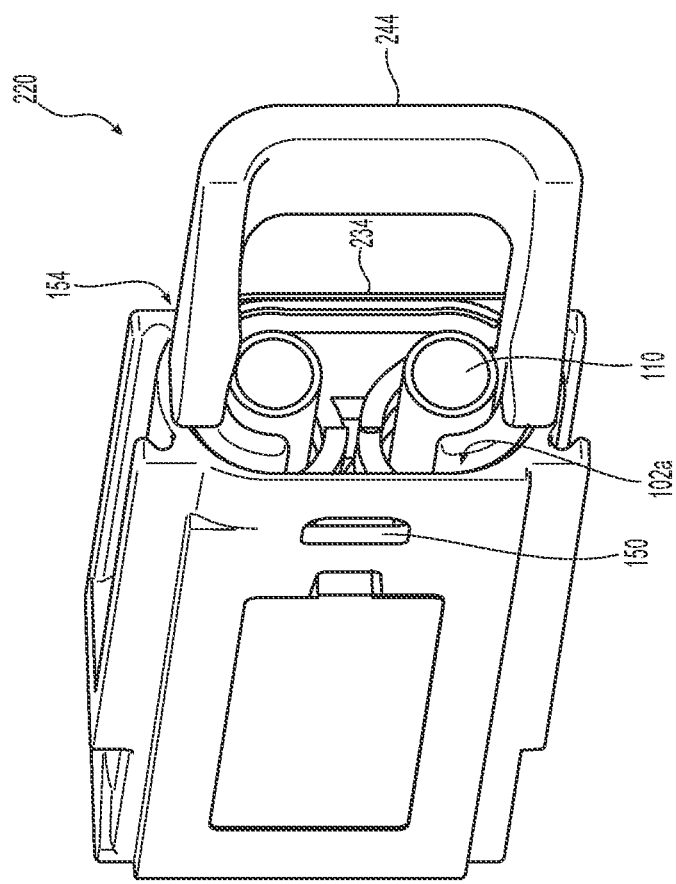
FIG. 12 is a perspective view of the restraining mechanism of FIG. 10 inserted into the rearward end of the housing.
Figure 13:
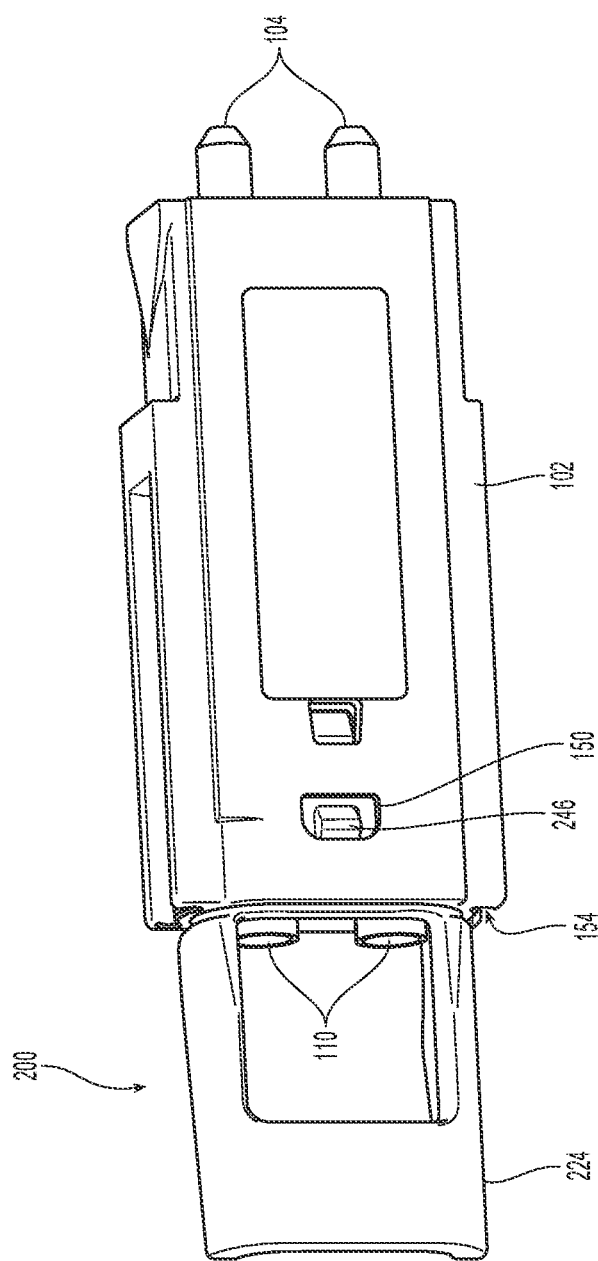
FIG. 13 is a side perspective view of the restraining mechanism inserted into the housing.

One such structure is illustrated in FIGS. 2-7 in the form of a removable curing clip 120. The removable curing clip 120 for the fiber optic connector 100 and the housing 102 in particular has a main body 122, a first arm 124, and a second arm 126. The first arm 124 and the second arm 126 define a space 128 therebetween. The first arm 124 and the second arm 126 each have an inside surface 130 and 132, respectively, that face one another. The first arm 124 and the second arm 126 are connected to one another by a central portion 134. The removable curing clip 120 is preferably made of plastic and therefore has some resilience. The first arm 124 and the second arm 126 can flex toward and away from one another as explained in more detail below. The central portion 134 is illustrated as a rounded form, but could take other shapes. For example, as illustrated in FIG. 8, the central portion 134' of the removable curing clip 120' could have an M-shape, which again allows for the flex of the first arm 124' and the second arm 126'.

Figure 4:
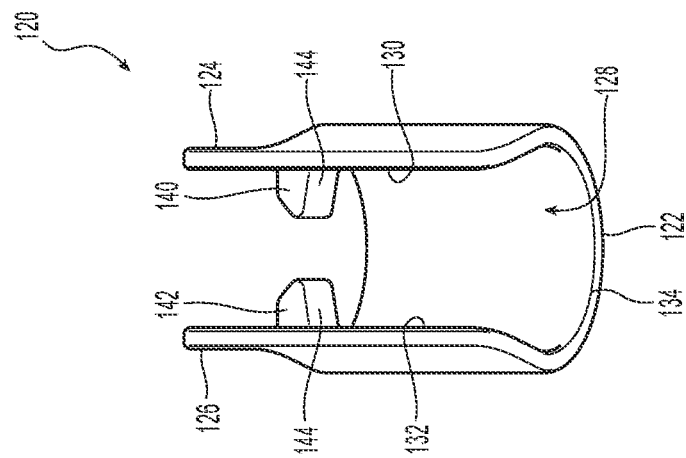
FIG. 4 is a perspective view of the removable curing clip in FIG. 2 partially from the front.
Figure 3:
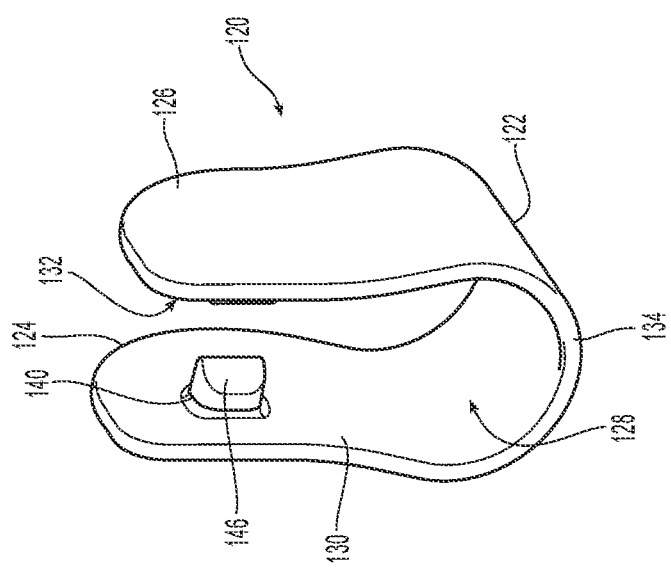
FIG. 3 is a perspective view of the removable curing clip in FIG. 2 from the back.

As best illustrated in FIGS. 3 and 4, the first arm 124 has a spring stop 140, while the second arm 126 has a spring stop 142. The spring stops 140,142 extend from the inside surfaces 130, 132 into the space 128 between the first and second arms 124,126. The spring stops 140 and 142 have a first surface 144 and a second surface 146. The first surface 144 is a forward facing surface that is used to engage the springs 108. The second surface 146 is a rearward facing surface that has a ramp that is used to disengage the removable curing clip from the housing 102, as explained below.

Figure 5:
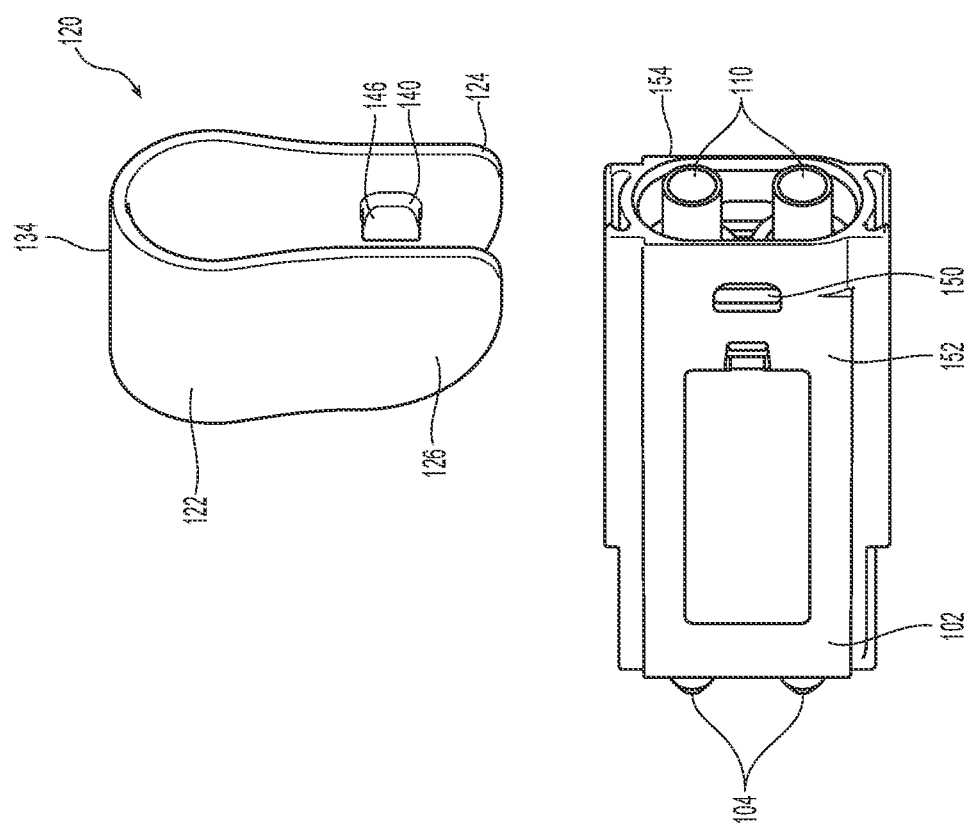
FIG. 5 is a perspective view of the removable curing clip in FIG. 2 and the housing with the two fiber optic ferrules, springs and lead-in tubes.
Figure 7:
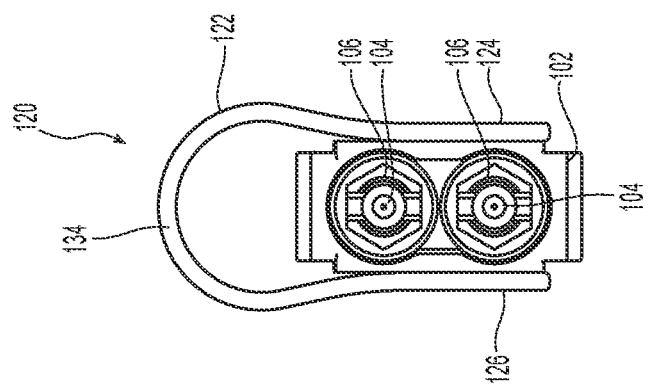
FIG. 7 is a front elevational view of the removable curing clip in FIG. 2 on the housing.
Figure 6:
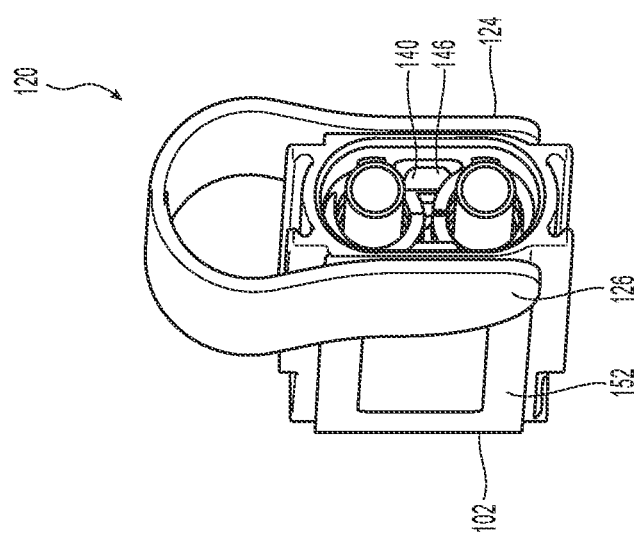
FIG. 6 is a rear perspective view of the removable curing clip in FIG. 2 connected to the housing.

As illustrated in FIG. 5, the removable curing clip 120 is positioned above the housing 102 with the housing 102 having the fiber optic ferrules 104, fiber optic ferrule holders 106, springs 108, and lead-in tubes 110. The housing 102 preferably has two openings 150, one in each side 152 of the housing 102, near the rear end 154. The position of the openings 150 along the housing 102 depends on how far back toward the rear end 154 the springs 108 extend.

The removable curing clip 120 is pressed downward onto the housing 102, causing the arms 124,126 to flex outward. The removable curing clip 120 could be attached to the housing from any appropriate direction and not just from above. When the spring stops 140,142 line up with the openings 150, the arms are urged inward to engage the springs 108 through the openings 150. Since the spring stops 140,142 are to engage the springs 108, the openings 150 cannot be too far behind the springs 108. The spring stops 140, 142 can engage the last turn of the springs 108 or they could engage anyone of the turns of the springs 108 closer to the fiber optic ferrules 104. Thus, the openings 150 could be placed in a number of places along the sides 152. The first surface 144 of the spring stops 140, 142 engage the springs to hold the fiber optic ferrules 104, fiber optic ferrule holders 106, and springs 108 in position relative to one another. The spring stops 140, 142 may cause a bit of compression of the springs 108 once inserted into the openings 150. The position of the springs 108 within the housing may have to be changed (i.e., compressed, rotated, etc.) to allow for both of the spring stops 140, 142 to engage the springs 108.

Once the removable curing clip 120 is positioned on the housing 102, the optical fibers and the epoxy (not shown) can be inserted into the fiber optic ferrules 104 and the assembly can then be cured in an oven or other appropriate environment.

After the curing of the epoxy is finished, the crimp body 112 and the spring push 114 can be attached to the housing 102. The spring push 114 has an angled front end 160 that, as the spring push 114 is advanced into the housing 102, engages the second surface 146 of the spring stops 140,142. This movement pushes the spring stops 140,142 out of the openings 150 and allows for the removable curing clip 120 to be disengaged from the housing 102. The fiber optic connector 100 can then be fully assembled.

A second embodiment of a removable curing clip 220 is illustrated in FIGS. 10-13. The removable curing clip 220 is preferably inserted into a central opening 102a of the housing 102 from the rear end 154. It should be noted that the fiber optic ferrules 104, fiber optic ferrule holders 106, springs 108, and the lead-in tubes 110 are all disposed within the central opening 102a of the housing 102.

The removable curing clip 220 has a main body 222, a first arm 224, a second arm 226, a central portion 234, a first spring stop 240, a second spring stop 242, and a handle 244. The removable curing clip 220 also has a latch 246 that extends outward from the central portion 234. The latch 246 is designed to engage an opening 150 in the housing 102. The latch 246 also has a first side 252 and a second side 254, the first side 252 is preferably flat and the second side 254 is chamfered or has a ramp-like construction. These sides assist in inserting and removing the removable curing clip 220 as discussed in more detail below.

The first arm 224 and the second arm 226 are a portion of a cylinder, which has a shape that is similar to the springs 108. The first arm 224 and the second arm 226 could have other shapes. The first arm 224 and the second arm 226 both have a spring stop, a first spring stop 240 and a second spring stop 242, respectively. The spring stops 240,242 are illustrated as recessed portions of the first arm 224 and the second arm 226. The springs 108 fit within the first spring stop 240 and second spring stop 242 as the removable curing clip 220 is inserted into the central opening 102a of the housing 102. As the removable curing clip 220 is advanced into the central opening 102a, the ramp-like construction of the second side 254 of the latch 246 aids in the insertion of the removable curing clip 220 into the housing 102 by flexing the housing 102 outward and the central portion 134 inward as it contacts the housing 102. As the removable curing clip is continued to be advanced, the latch 246 will encounter the opening 150 in the housing 102. The latch 246 will protrude through the opening 150. The flat side of the latch 246, the first side 252, can engage a portion of the housing 102 that forms the opening 150. This prevents the removable curing clip 220 from being removed unintentionally during the epoxy insertion and curing in the appropriate environment. The removable curing clip 220 can be pulled by the handle 244 to disengage the latch from the housing 102 after the curing is complete. A tool or other object can be used to disengage the latch 246 from the opening 150. There can be an opening 150 on only one side or both sides of the housing 102. With openings 150 on both sides, the removable curing clip 220 can be inserted with the handle 144 oriented toward either side of the housing 102.

Figure 14:
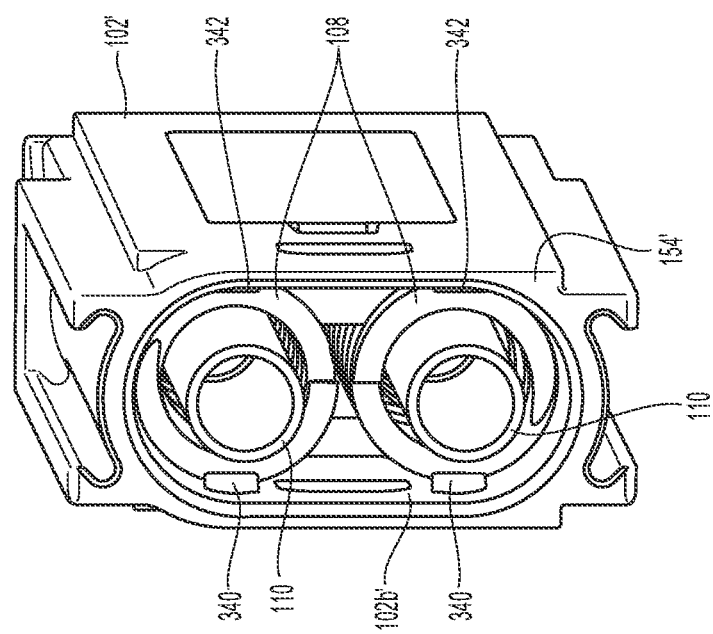
FIG. 14 is an end view of a housing having a restraining mechanism (projections) extending into an opening in the housing to engage the springs.
Figure 15:
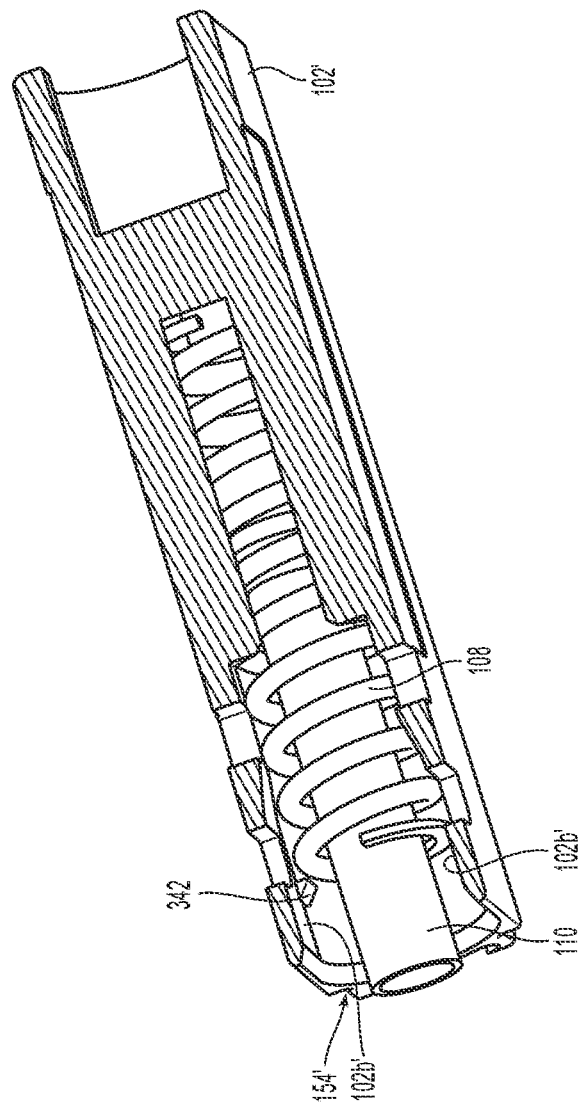
FIG. 15 is a cross section view from the bottom looking into the opening where the restraining mechanism engages a spring.

In yet another embodiment according to the present invention, illustrated in FIGS. 14 and 15, are spring stops 340,342 (or projections) that extend from the housing 102'. In fact, the spring stops 340,342 extend from an inner surface 102b' of the housing 102'. Preferably the spring stops 340,342, like those mentioned above, have a chamfered or ramp-like surface that faces the rear end 154' that allows for an easier insertion of the springs 108 into the housing 102'. The spring stops 340,342 also preferably have a flat surface facing away from the rear end 154' to engage and retain the springs 108. There may be a number of the spring stops 340,342 within the housing 102' to increase the engagement of the springs. The spring stops 340,342 may also take on other forms than that shown in FIGS. 14 and 15.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A housing for a fiber optic connector having two fiber optic ferrules and two springs comprising:
    a main body with a central opening for receiving from a rear end the two fiber optic ferrules and two springs, one of the springs being disposed behind each of the two ferrules; and
    a restraining mechanism engageable with the two springs, wherein the restraining mechanism is configured to prevent movement of the two springs relative to the fiber optic ferrules and the housing during curing of an epoxy inserted into the fiber optic connector.

2. The housing according to claim 1, wherein the restraining mechanism is one of:
    an insertable curing clip having at least one spring stop to engage the two springs; and
    internal projections integral to the main body and projecting into the central opening, the internal projections each sized to engage one of the two springs.

3. The housing according to claim 2, wherein the insertable curing clip is inserted from the rear end of the main body.

4. The housing according to claim 2, wherein the insertable curing clip has a projection to engage an opening in the main body to retain the insertable curing clip in the central opening.

5. The housing according to claim 1, wherein the restraining mechanism comprises a main body having a first arm and a second arm, defining a space therebetween; and a spring stop on each of the first arm and the second arm on respective inside surfaces thereof and extending into the space, the inside surfaces of the first arm and second arm facing each other.

6. The housing according to claim 5, wherein the spring stops pass through an opening in the housing of the fiber optic connector to engage the springs.

7. The housing according to claim 5, wherein the spring stops have a first surface and a second surface, the first surface to engage the at least one spring, the second surface to engage a spring push to push the spring stops out of an opening in the housing of the fiber optic connector.

8. A removable curing clip for a fiber optic connector having a housing, at least one fiber optic ferrule and at least one spring comprising:
    a main body having a first arm and a second arm, defining a space therebetween to receive the housing of the fiber optic connector; and
    a spring stop on each of the first arm and the second arm on respective inside surfaces thereof and extending into the space, the inside surfaces of the first arm and second arm facing each other.

9. The removable curing clip according to claim 8, wherein the main body further comprises a central portion, the central portion joining the first arm to the second arm.

10. The removable curing clip according to claim 8, wherein the first arm and the second arm are flexible relative to one another.

11. The removable curing clip according to claim 8, wherein the spring stops pass through an opening in the housing of the fiber optic connector.

12. The removable curing clip according to claim 11, wherein the housing of the fiber optic connector has a central opening to receive at least one fiber optic ferrule with a spring disposed rearwardly of the fiber optic ferrule, the spring stops passing through the opening in the housing to engage the spring disposed within the central opening.

13. The removable curing clip according to claim 8, wherein the central portion has a folded portion.

14. The removable curing clip according to claim 8, wherein the spring stops have a first surface and a second surface, the first surface to engage the at least one spring, the second surface to engage a spring push to push the spring stops out of an opening in the housing of the fiber optic connector.

15. A method of curing epoxy in a fiber optic connector comprising the steps of:
    placing at least one fiber optic ferrule into a housing of the fiber optic connector;
    placing a spring behind the at least one fiber optic ferrule;
    using a restraining mechanism to restrain the spring relative to the housing of the fiber optic connector;
    inserting an optical fiber and epoxy into the at least one fiber optic ferrule;
    curing the epoxy in the fiber optic connector; and
    maintaining the spring, fiber optic ferrule and housing within a predetermined range during the curing.

16. The method according to claim 15, wherein the restraining mechanism is one of:
    an insertable curing clip having at least one spring stop to engage the two springs; and
    an internal projection integral to the main body and projecting into the central opening, the internal projection sized to engage each of the two springs.

17. The method according to claim 15, further comprising the step of inserting a spring push and/or a crimp body into the housing of the fiber optic connector thereby releasing the restraining mechanism.

18. The method according to claim 15, further comprising the step of removing the restraining mechanism before inserting a spring push and/or a crimp body into the housing of the fiber optic connector.

* * * * *